SLIVER COILING APPARATUS

Filed June 26, 1951

Inventors
William Harold Watson
and Joseph Osbaldeston
By Moses, Nolte, Crews & Berry
Attorneys Jan. 26, 1954 W. H. WATSON ET AL 2,666,959

SLIVER COILING APPARATUS

Filed June 26, 1951 8 Sheets-Sheet 2

Inventors
William Harold Watson
and Joseph Osbaldeston
By Moses, Nolte, Crews & Berry
Attorneys Jan. 26, 1954 W. H. WATSON ET AL 2,666,959

SLIVER COILING APPARATUS

Filed June 26, 1951 8 Sheets-Sheet 3

Inventors
William Harold Watson
and Joseph Osbaldeston
By Moses, Nolte, Crews & Berry
Attorneys Inventors
William Harold Watson
and Joseph Osbaldeston
By Moses, Nolte, Crews + Berry
Attorneys Inventors
William Harold Watson
and Joseph Osbaldeston
By Moses, Nolte, Crews + Berry
Attorneys Inventors
William Harold Watson
and Joseph Osbaldeston
By Moses, Nolte, Crews + Berry
Attorneys Jan. 26, 1954 W. H. WATSON ET AL 2,666,959

SLIVER COILING APPARATUS

Filed June 26, 1951 8 Sheets-Sheet 7

Inventors
William Harold Watson
and Joseph Osbaldeston
By Moses, Nolte, Crews & Berry
Attorneys

SLIVER COILING APPARATUS

Filed June 26, 1951 8 Sheets-Sheet 8

Inventors
William Harold Watson
and Joseph Osbaldeston
By Moses, Nolte, Crews + Berry
Attorneys

UNITED STATES PATENT OFFICE 2,666,959

SLIVER COILING APPARATUS

William Harold Watson and Joseph Osbaldeston, Helmshore, England, assignors to T. M. M. (Research) Limited, Helmshore, England Application June 26, 1951, Serial No. 233,548

8 Claims. (Cl. 19—159)

The invention is concerned with the sliver coiling apparatus which is commonly employed in conjunction with textile draw-frames, combers and other machines in which the output material is in sliver form. Hitherto it has been customary in those of such machines having a plurality of separate delivery heads to coil the sliver from each head into a separate can; the object of this invention is to provide an improved form of coiling apparatus whereby the several deliveries of sliver from a plurality of heads may be coiled independently in a common can, thereby lessening the degree of supervision required from the machine attendant and reducing the work involved in the replacement of filled cans. A further advantage is the substantial saving of floor space permitted by the concentration of output in one can.

A coiling apparatus according to the invention comprises in combination a battery of coiler-heads in grouped relationship, means common to the several coiler heads for rotating the sliver guides and driving the calender rollers of all the coiler heads in unison, a support for a can capable of receiving the collective output of all said coiler heads, and means operatively associated with the aforesaid driving means, for imparting to said can support a form of motion such that the can is caused to partake of a translatory movement following a circular orbit, thereby producing the desired independently coiled formation of each sliver delivered into the same.

Figure 1:
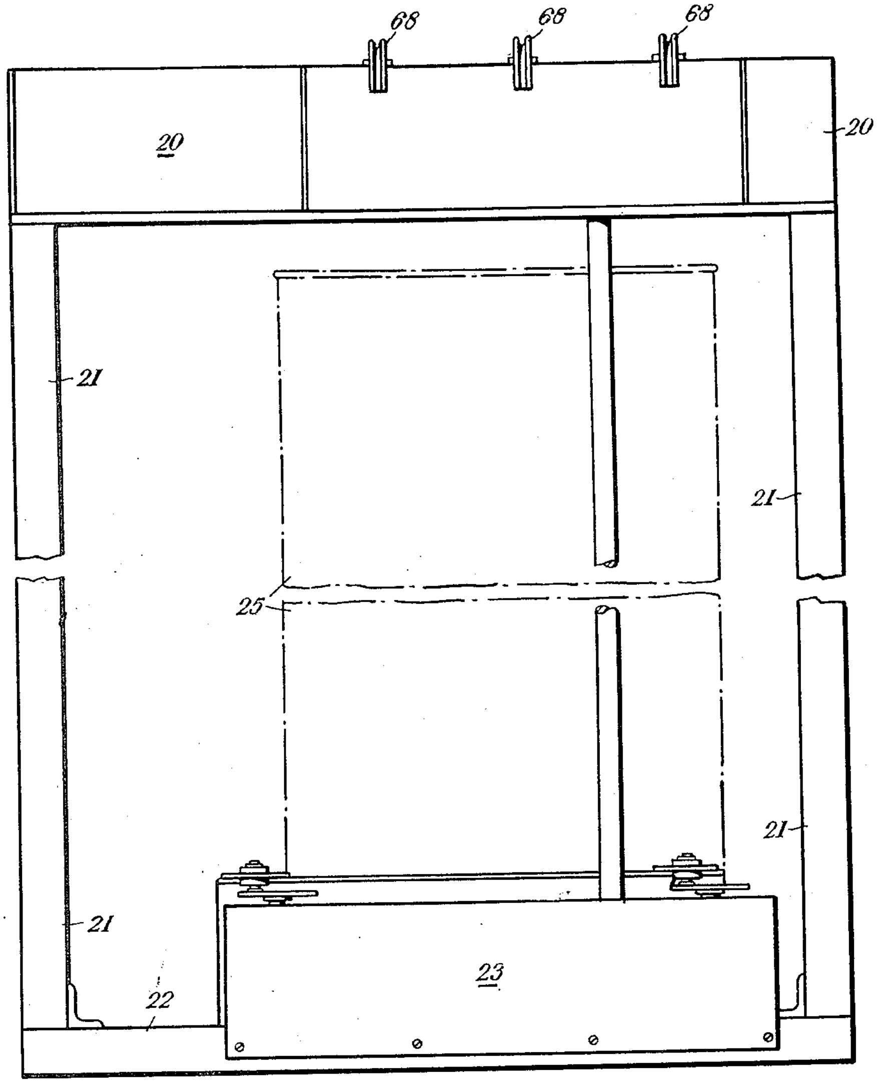
Figure 2:
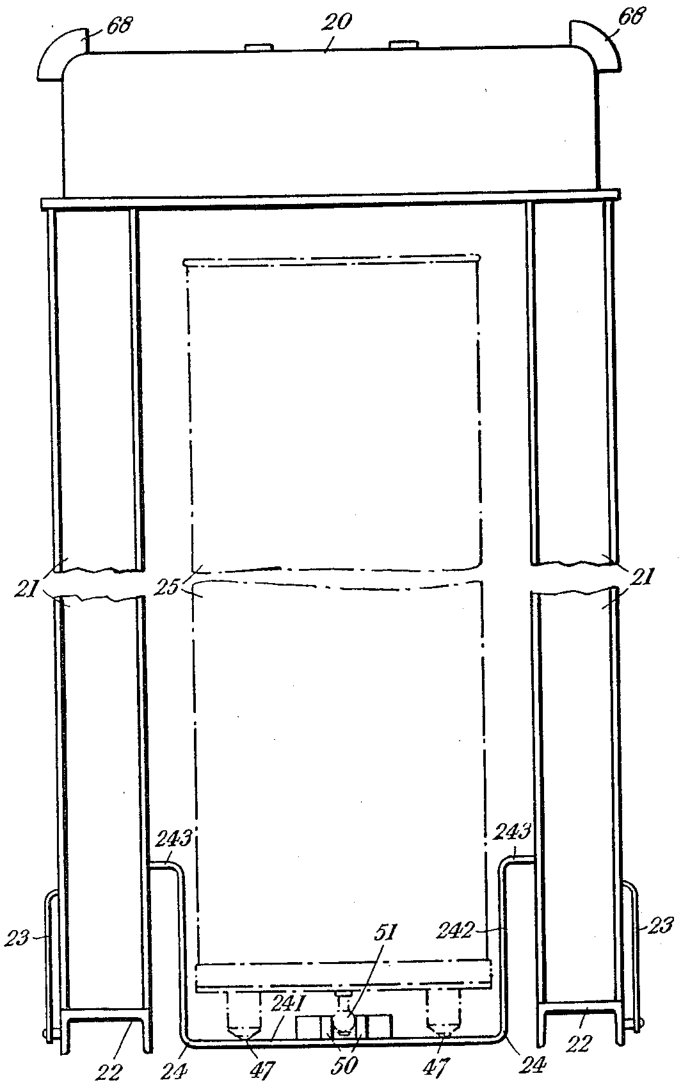
Figure 3:
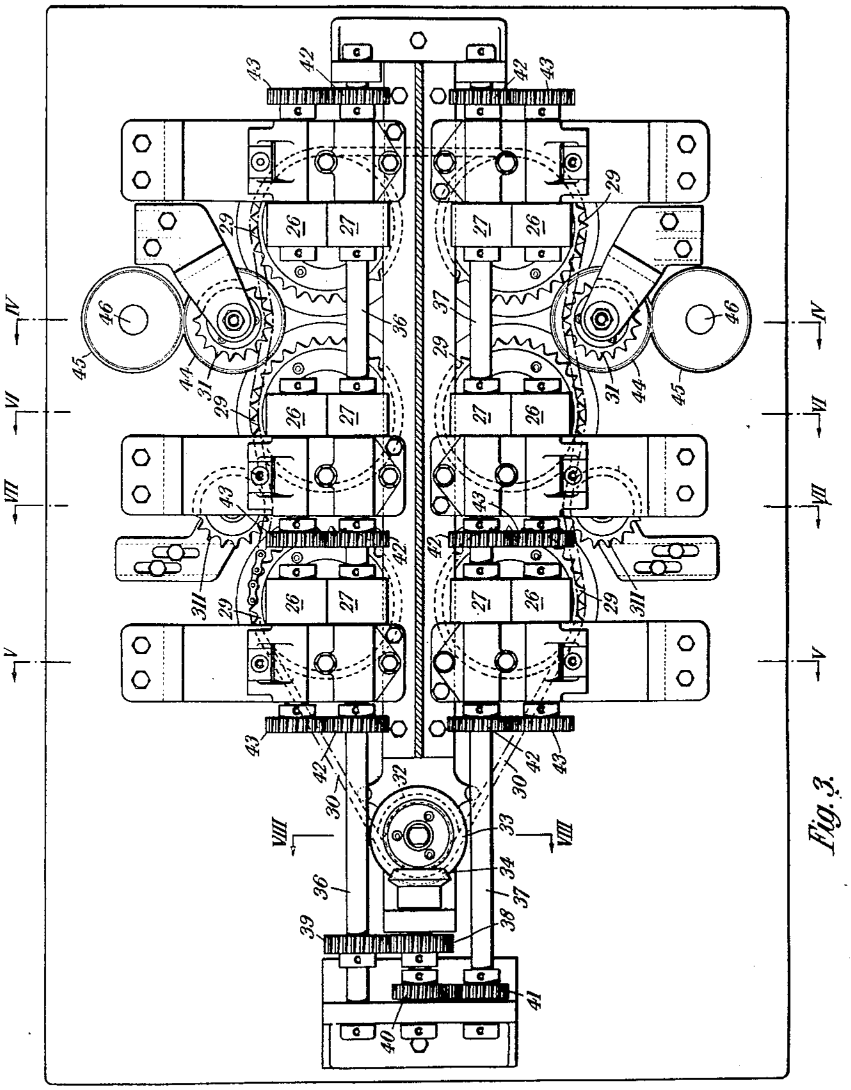
Figure 4:
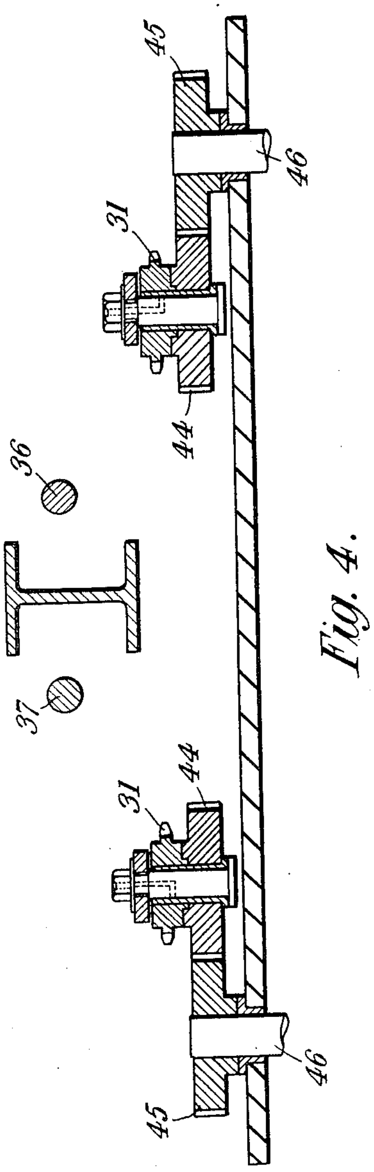
Figure 5:
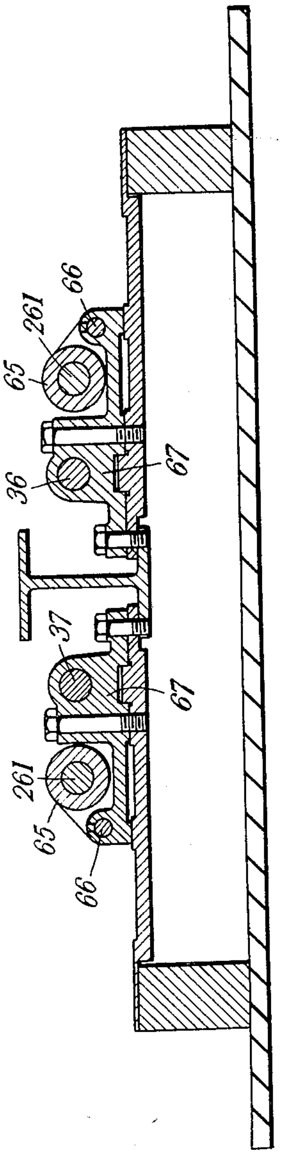
Figure 9:
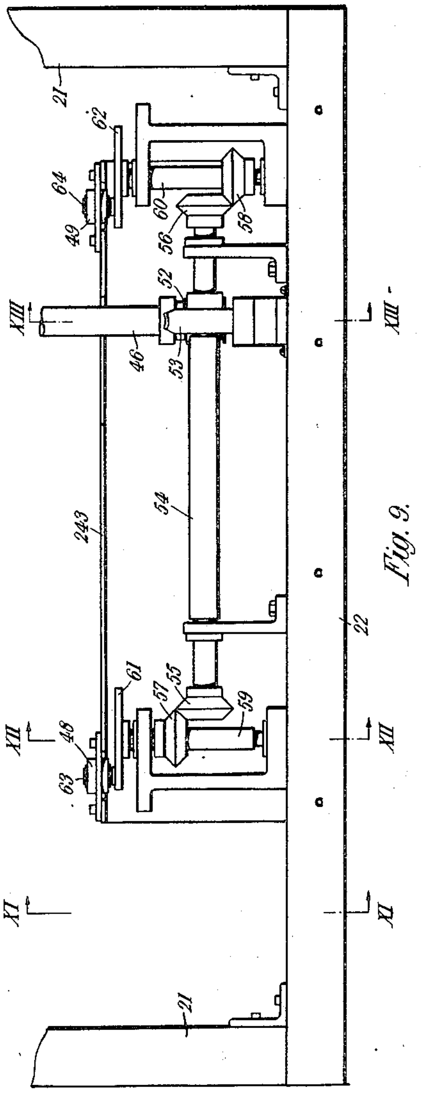
Figure 11:
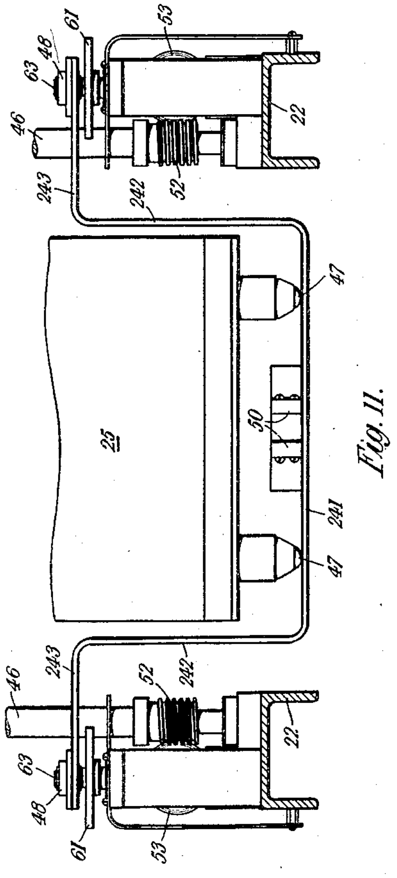
Figure 10:
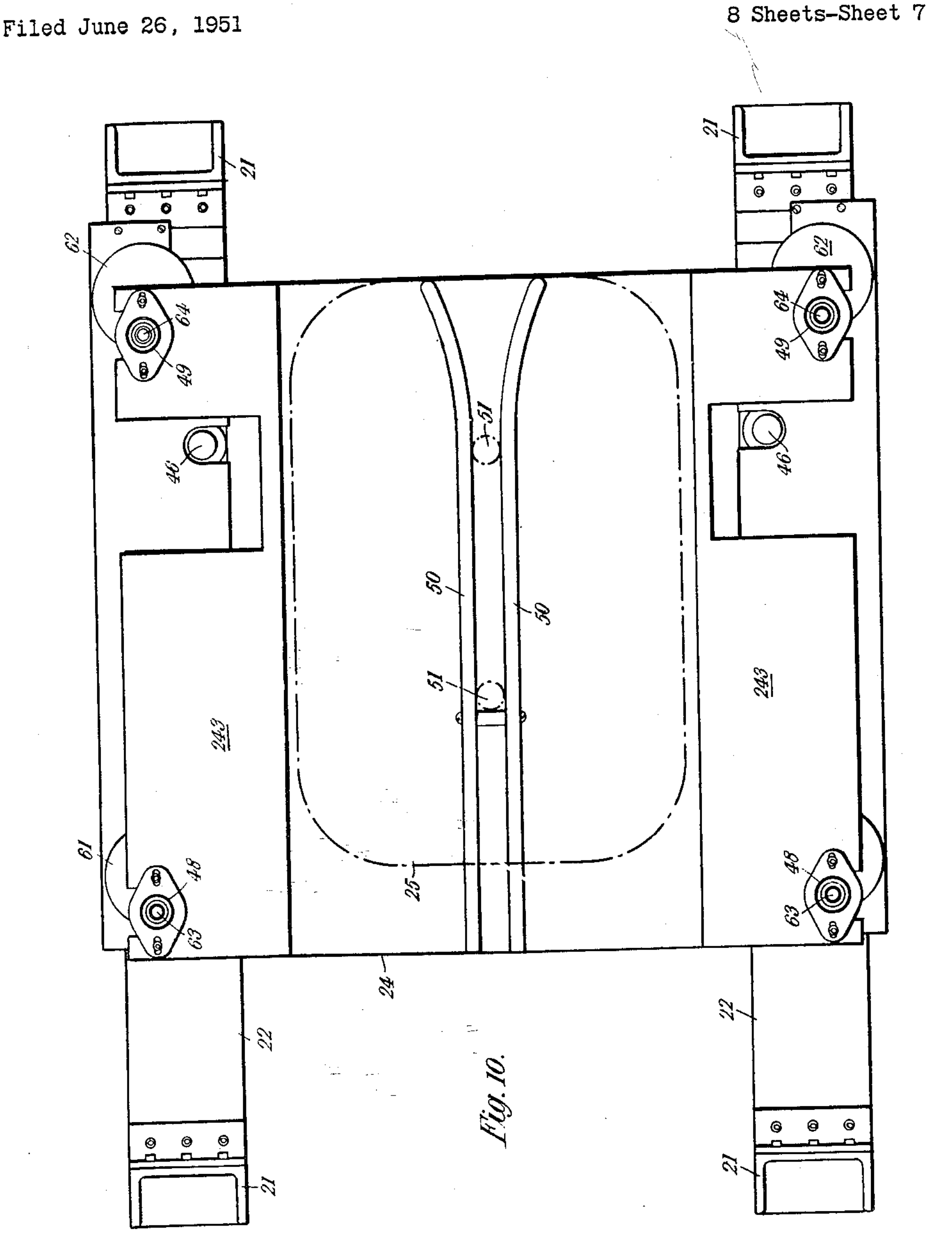
Figure 12:
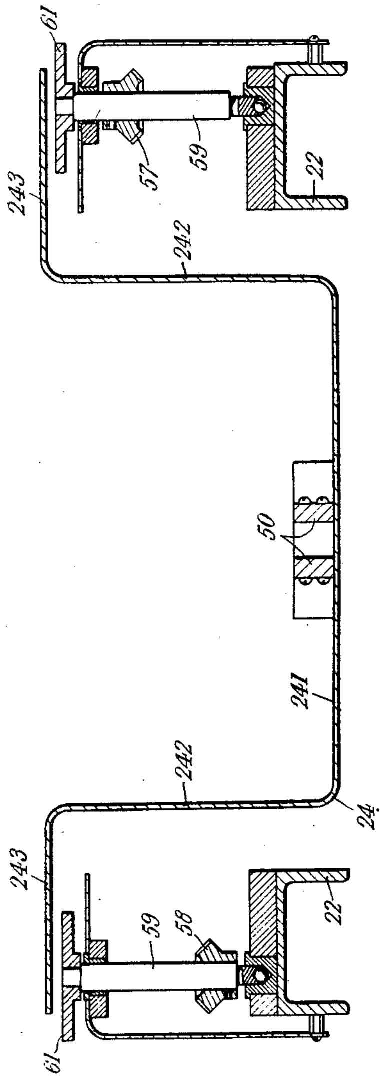
Figure 13:
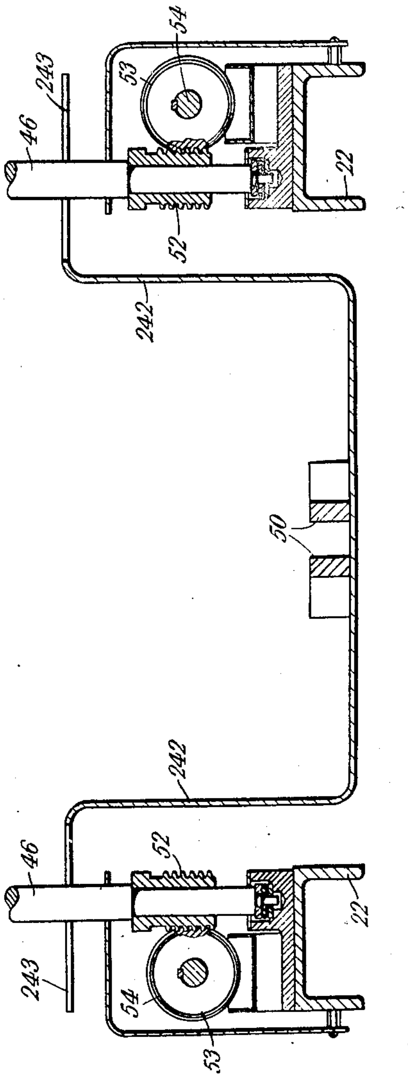

One embodiment of the invention, as applied to a multiple coiling apparatus intended to receive a plurality of slivers, say six, from a machine such as a carding-engine or a draw-frame, having six delivery heads, is illustrated in and hereinafter described with reference to the accompanying drawings. In said drawings Figs. 1 and 2 are respectively a side elevation and an end elevation of the apparatus. Fig. 3 is a plan of the coiler-head and associated mechanism after removal of the head casing, and Figs. 4, 5, 6, 7 and 8 are respectively cross-sections on the lines IV—IV, V—V, VI—VI, VII—VII and VIII—VIII, of Fig. 3. Figs. 9 and 10 are respectively a side elevation and a plan of the basal parts of the apparatus, and Figs. 11, 12 and 13 are respectively cross-sections on the lines XI—XI, XII—XII and XIII—XIII of Fig. 9.

The apparatus comprises a coiler-head and a base. The coiler-head is enclosed in a casing 20 and is supported by channel-section stanchions 21, 21 which are mounted at their feet upon longitudinal base-members 22, 22, which latter also serve to support the duplicated mechanisms (enclosed in the casings 23, 23) which are used to impart the desired translatory or orbital motion to the table or can support 24 which carries the sliver can 25.

The coiler-head incorporates six coiling units of which each comprises a pair of calender rollers 26, 27 arranged to feed a sliver to an inclined sliver guide 28 rotatable about a vertical axis. Each sliver guide 28 carries a fixed chain sprocket 29 arranged to be driven by an endless chain 30 which is common to the sprockets 29 of the other five coiler heads.

Suitable jockey or tension sprockets 31 and 311 are provided and the chain 20 also passes around a pinion 32 which, through gearing 33, 34, imparts motion to a short counter-shaft 35 which is in turn arranged to drive two horizontal shafts 36 and 37, respectively through gear-trains 38, 39 and 40, 41. The six coiler heads are arranged in two rows of three, and the calender roller 27 of each pair is mounted on one of said two horizontal shafts 36, 37, the other roller 26 being driven through a gear-train 42, 43, the gear 43 being mounted on a shaft 261 of the roller 26.

Fixed to each of the jockey sprockets 31 is a gear 44 which meshes with a gear 45 on a vertical shaft 46. One of said vertical shafts 46 is driven from the machine driving shaft (not shown) of the machine with which the apparatus is associated, or by a separate motor or other driving means. Driving motion thus imparted to said vertical shaft 46 is communicated through said chain 30 to each of the sprockets 29 of the six coiler heads and through the pinion 32 and gearing 33, 34, 38, 39, and 40, 41, to the calender roller driving shafts 36, 37 so that all the coiler-heads are driven in unison.

The several coiler heads are arranged to deliver into a common can which is preferably rectangular in plan form. A suitable form of can, mounted on anti-friction balls 47, is indicated at 25 in Figs. 1 and 2. The orbital movement of said can 25 necessary to achieve the desired coiled formation of the slivers delivered thereinto is brought about by mounting the can 25 upon the movable support or table 24 which is actuated by the mechanisms supported on the base-member 22 as hereinafter described.

The table or can support 24 consists of a stout sheet of steel shaped to provide a central trough-like portion 241 upon which the can 25 may be pushed, and at either side of said portion 241 an upstanding part 242 which is bent outwardly at its upper edge to form a horizontal portion 243, as shown in Figs. 2 and 11. Each of said portions 243 of the table 24 mounts two bushes 48 and 49 which receive the crank-pins 63 and 64 hereinafter referred to. The trough-portion 241 of the table 24 is also provided with two spaced rails 50, 50, flared apart at one end as shown in Fig. 10, to constitute a guide for a pair of downwardly projecting pegs 51 which are mounted beneath the can 25 and which serve to ensure that the latter is placed centrally on the table.

The mechanism for imparting an orbital movement to the table 24 is duplicated. Each set of such mechanism is self-contained, being carried on the base-member 22 between the stanchions 21, and consists of a worm 52 at the base of the adjacent vertical shaft 46 by which driving motion is imparted to a worm-wheel 53 mounted on a horizontal shaft 54 at the respective ends of which are bevel-gears 55, 56. Said bevel-gears 55, 56 respectively mesh with bevel-gears 57, 58 on two short vertical shafts 59, 60, carrying disc-cranks 61 and 62, which latter are respectively furnished with the aforesaid crank-pins 63 and 64 which engage bushes 48 and 49 in the horizontal part 243 of the table 24. Rotary motion of the shaft 46 is transmitted to each disc-crank 61, 62 through the intermediate gearing referred to so that each pair of crank-pins 63, 64 imparts an orbital movement to the table and the can 25 supported thereby, the diameter of the orbit described by the can being equal to the throw of the cranks 61, 62. The bushes 48, 49 are preferably sufficiently resilient to accommodate by their flexibility such vibration or misalignment of the mechanism as may occur.

The effect of the rotation of each coiler-head guide 28 taken in conjunction with the orbital motion of the can 25 is to coil each sliver independently in a separate coiled stack approximately filling one-sixth of the volume of the can, each succeeding coil in each stack being displaced somewhat from the coil previously laid and the centres of successive coils lying on a circle described by the orbital motion of the can.

Figure 6:
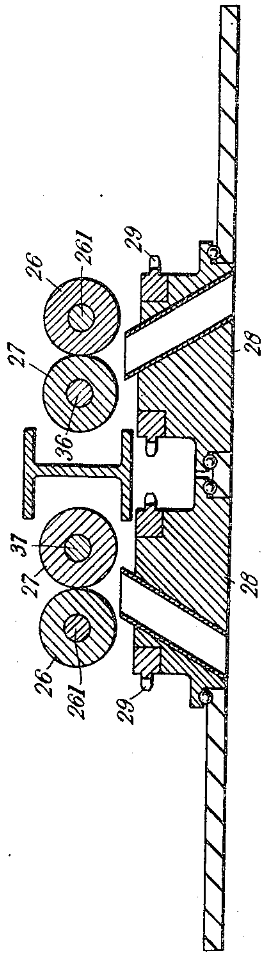
Figure 7:
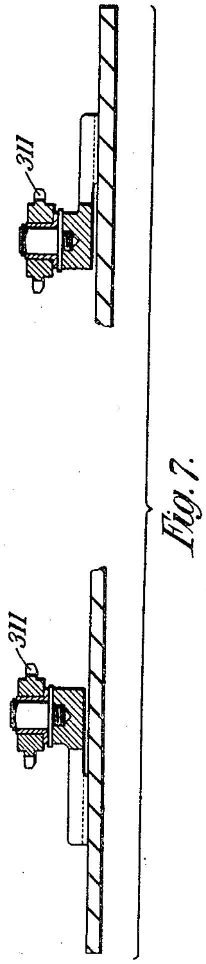
Figure 8:
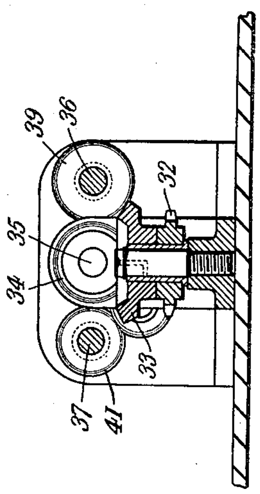

In order that any coiler-unit may be put out of action without interfering with the remaining units, it is convenient to mount the shafts 261 of the calender rollers 26 in subsidiary brackets 65 which are pivoted at 66 upon the brackets 67 in which the shafts 37 of the rollers 27 are mounted (see Fig. 6). It is possible with this arrangement to swing any of the brackets 65 about its pivot 66 and thereby interrupt the feed of the sliver between the rollers 26, 27 of that coiler-head. The members 68 illustrated in Figs. 1 and 2 are grooved guides adapted to lead the respective slivers to their appropriate coiler-heads.

What we claim as our invention and desire to secure by Letters Patent is:

1. A sliver coiling apparatus comprising, in combination, a battery of coiler heads in grouped relation, each including a pair of calender rollers and a sliver guide, means common to the several coiler heads for rotating the sliver guides and for driving the calender rollers of the coiler heads in unison, a support for a can, said can receiving the collective output of all the coiler heads in independent coils, and parallel motion driving mechanism operated by the aforesaid driving means, imparting identical translatory circular movement to every point of the can support, thereby producing the desired independently coiled formation of each sliver delivered into the can, so that each coil can be subsequently separately withdrawn.

2. A sliver coiler apparatus as set forth in claim 1 wherein the parallel motion driving mechanism is geared to run in proportion to, but much more slowly than, the sliver guides.

3. An apparatus as claimed in claim 1 wherein each sliver guide is mounted for rotation about a vertical axis and is equipped with a sprocket, and in which the means common to the several coiler heads for rotating the sliver guides and for driving the calendar rolls of the coiler heads in unison comprises a drive shaft, a drive sprocket thereon, and a single chain engaged with the drive sprocket and with all the sliver guide sprockets for driving the latter.

4. An apparatus as claimed in claim 1 wherein each sliver guide is mounted for rotation about a vertical axis and is equipped with a sprocket, and in which the means common to the several coiler heads for rotating the sliver guides and for driving the calendar rolls of the coiler heads in unison comprises a drive shaft, a drive sprocket thereon, and a single chain engaged with the drive sprocket and with all the sliver guide sprockets for driving the latter, and additional gearing driven by said chain and connected to drive the calender rollers of the several coiler heads.

5. An apparatus as claimed in claim 1 wherein each sliver guide is mounted for rotation about a vertical axis and is equipped with a sprocket, and in which the means common to the several coiler heads for rotating the sliver guides and for driving the calender rolls of the coiler heads in unison comprises a drive shaft, a drive sprocket thereon, and a single chain engaged with the drive sprocket and with all the sliver guide sprockets for driving the latter, and additional gearing driven by said chain and connected to drive the calender rollers of the several coiler heads, the coiler heads being arranged in two parallel lines, and the additional gearing referred to including two parallel shafts, each driving all the calender rollers of one of the lines of coiler heads.

6. An apparatus as set forth in claim 1 wherein the can support comprises a trough-shaped member capable of receiving a sliver can in the trough thereof, and wherein the parallel motion driving mechanism comprises a plurality of cranks rotating in a horizontal plane, and means operatively connecting said cranks with the aforesaid driving means.

7. An apparatus as claimed in claim 1 wherein each sliver guide is mounted for rotation about a vertical axis and is equipped with a sprocket, and in which the means common to the several coiler heads for rotating the sliver guides and for driving the calender rolls of the coiler heads in unison comprises a drive shaft, a drive sprocket thereon, and a single chain engaged with the drive sprocket and with all the sliver guide sprockets for driving the latter, the can support comprising a trough-shaped member capable of receiving a sliver can in the trough thereof, and the parallel motion driving mechanism comprising a plurality of cranks rotating in a horizontal plane, a vertical shaft for each of the cranks, each crank being made fast upon its shaft, and means for driving each shaft from the aforesaid chain.

8. An apparatus as set forth in claim 1 wherein the can support comprises a trough-shaped member capable of receiving a sliver can in the trough thereof, and wherein the parallel motion driving mechanism comprises a plurality of cranks rotating in a horizontal plane, and means operatively connecting said cranks with the aforesaid driving means, the can support including can centering means, cooperative with the can to guide and retain the can positively in a central position on the support.

WILLIAM HAROLD WATSON.
JOSEPH OSBALDESTON.

References Cited in the file of this patent

UNITED STATES PATENTS

| Number | Name | Date |
|---|---|---|
| 1,290,876 | Banfield | Jan. 14, 1919 |
| 1,607,723 | Crockett | Nov. 23, 1926 |
| 1,710,817 | Fliedner | Apr. 30, 1929 |
| 1,882,760 | Brown | Oct. 18, 1932 |
| 2,018,261 | Holdsworth | Oct. 22, 1935 |
| 2,181,777 | Asbelle | Nov. 28, 1939 |
| 2,228,963 | McGinnis | Jan. 14, 1941 |
| 2,355,071 | Hendrickson | Aug. 8, 1944 |

FOREIGN PATENTS

| Number | Country | Date |
|---|---|---|
| 817,007 | France | May 15, 1937 |